United States Patent [19]

Wilkens et al.

[11] 3,714,823
[45] Feb. 6, 1973

[54] FUEL CONSUMPTION METER

[75] Inventors: Henry W. Wilkens; Daniel D. Sabatino, both of Little Ferry, N.J.

[73] Assignee: Flowtron Industries Inc., Little Ferry, N.J.

[22] Filed: Sept. 11, 1970

[21] Appl. No.: 71,289

[52] U.S. Cl. ..... 73/113, 73/221, 137/391, 137/625.65, 251/65, 344/244 A
[51] Int. Cl. ..... G01f 3/36
[58] Field of Search ..... 73/113, 112, 219, 220, 221, 73/222, 308; 344/244 A; 137/625.65, 625.27, 391; 251/65

[56] References Cited

UNITED STATES PATENTS

| | | | |
|---|---|---|---|
| 3,332,283 | 7/1967 | Michalowicz | 73/219 |
| 3,000,207 | 9/1961 | Goffe | 73/113 |
| 2,366,412 | 1/1945 | Lambert | 137/625.65 |
| 3,512,600 | 5/1970 | Adams | 180/77 |
| 3,389,603 | 6/1968 | Jacobs | 73/308 |
| 950,752 | 3/1910 | Meek | 73/221 |
| 3,204,230 | 8/1965 | Hosford | 340/244 A |
| 3,369,394 | 2/1968 | Higgs | 73/113 |

OTHER PUBLICATIONS

"Fuel–O–Meter" by Columbia Systems of Portland, Ore.

Primary Examiner—James J. Gill
Assistant Examiner—Marvin Smollar
Attorney—Elliott I. Pollock

[57] ABSTRACT

A fuel meter for trucks having a fuel measuring chamber for measuring by float sensed levels a quantity of fuel and emptying that quantity into a reservoir from which the truck engine draws its fuel, the emptying occurring whenever the fuel level in the reservoir is low. A counter counts the number of times the measuring chamber thus empties in order to compute overall fuel consumption. The meter can be by-passed when out of order.

12 Claims, 7 Drawing Figures

INVENTORS
HENRY W. WILKENS
DANIEL D. SABATINO
BY Kenyon & Kenyon Reilly Carr & Chapin
ATTORNEYS

FUEL CONSUMPTION METER

BACKGROUND OF THE INVENTION

In the trucking industry, there is a need for accurate, reliable and inexpensive fuel meters which can measure fuel consumption. Preferably such meters should be capable of distinguishing between fuel used for travel when the truck is mobil and fuel used for auxiliary purposes when the truck is stationary, such as when the truck is stationary and its engine is being used for such purposes as powering hoisting or other auxiliary equipment. Such a meter should preferably be capable of use either with gasoline fuel truck engines which do not return unused fuel to the tank or with diesel fuel truck engines which do return unused fuel to the tank so that it may be user later. Such a meter should also be immune to errors which might be caused by sloshing of the fuel caused by truck movements.

THE INVENTION

This invention solves the problem in a very simple way by providing a means for occasionally emptying a predetermined measured quantity of liquid or fuel into a liquid reservoir from which the liquid or fuel is drawn by a utilizing device, such as the engine of a truck. That emptying is accomplished on each occasion that the utilizing device has drawn the reservoir liquid content down to a minimum content. By counting the number of times the measured quantity has been so emptied, one has an accurate measure of total liquid utilization.

THE DRAWINGS

FIG. 4 is a section along 4—4 of FIG. 3;

FIGS. 5 and 6 are views of an inlet outlet valve of the meter; and

DESCRIPTION OF THE PREFERRED EMBODIMENT

Fuel from a gas tank (not shown) is fed to the meter by suitable pipe connection to inlet 1. From there, it will either be passed through the meter to outlet 2 which is pipe connected to the motor (not shown) or by-passed around the meter to outlet 2 by valve 3. The by-pass is provided for the contingency that the meter fails to function properly to deliver fuel to the engine in which case the truck driver will wish to avoid having a disabled truck by using valve 3 to feed fuel directly to the motor.

Figure 1:
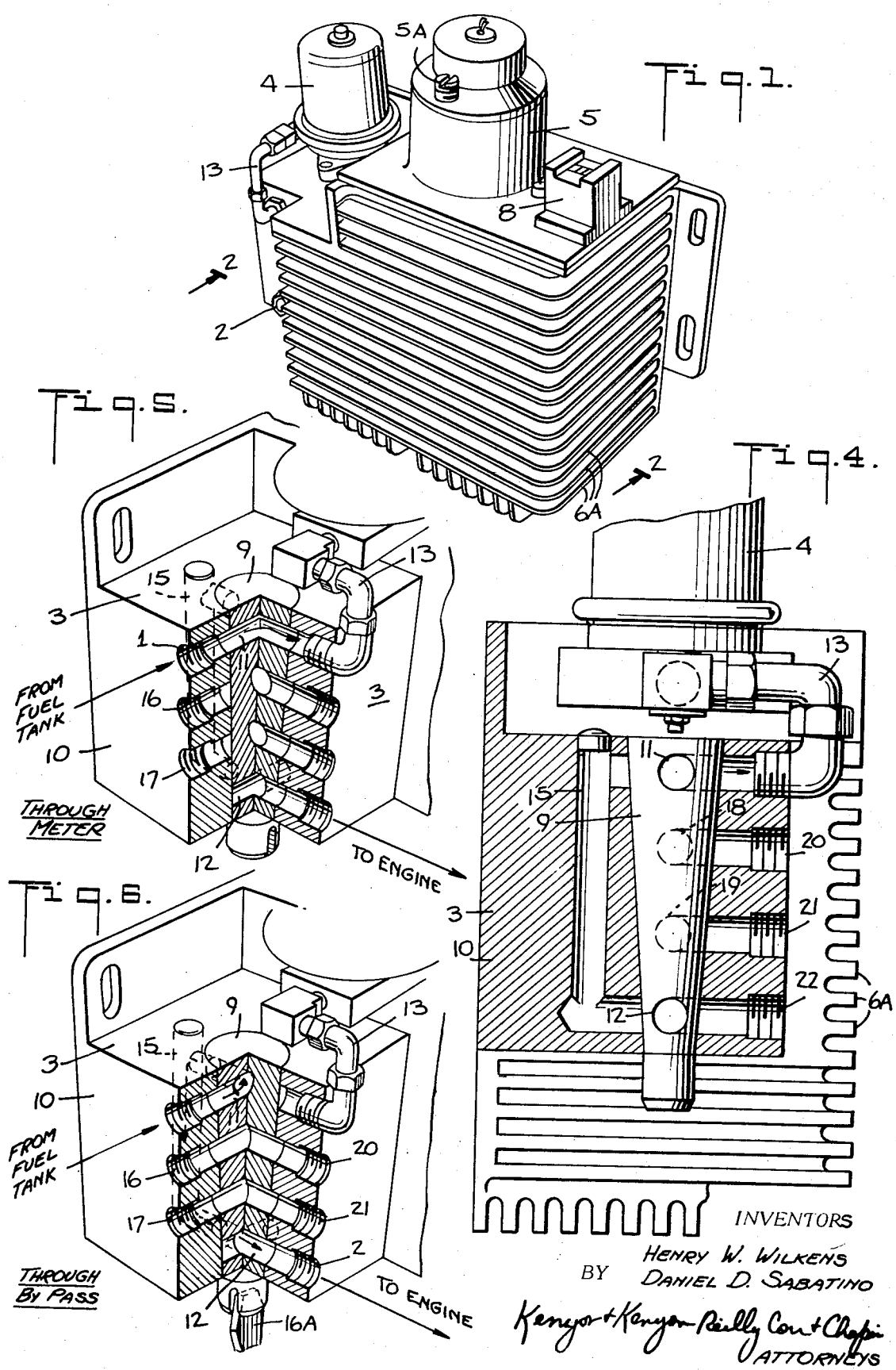
FIG. 1 is a perspective view of the meter.
Figure 2:
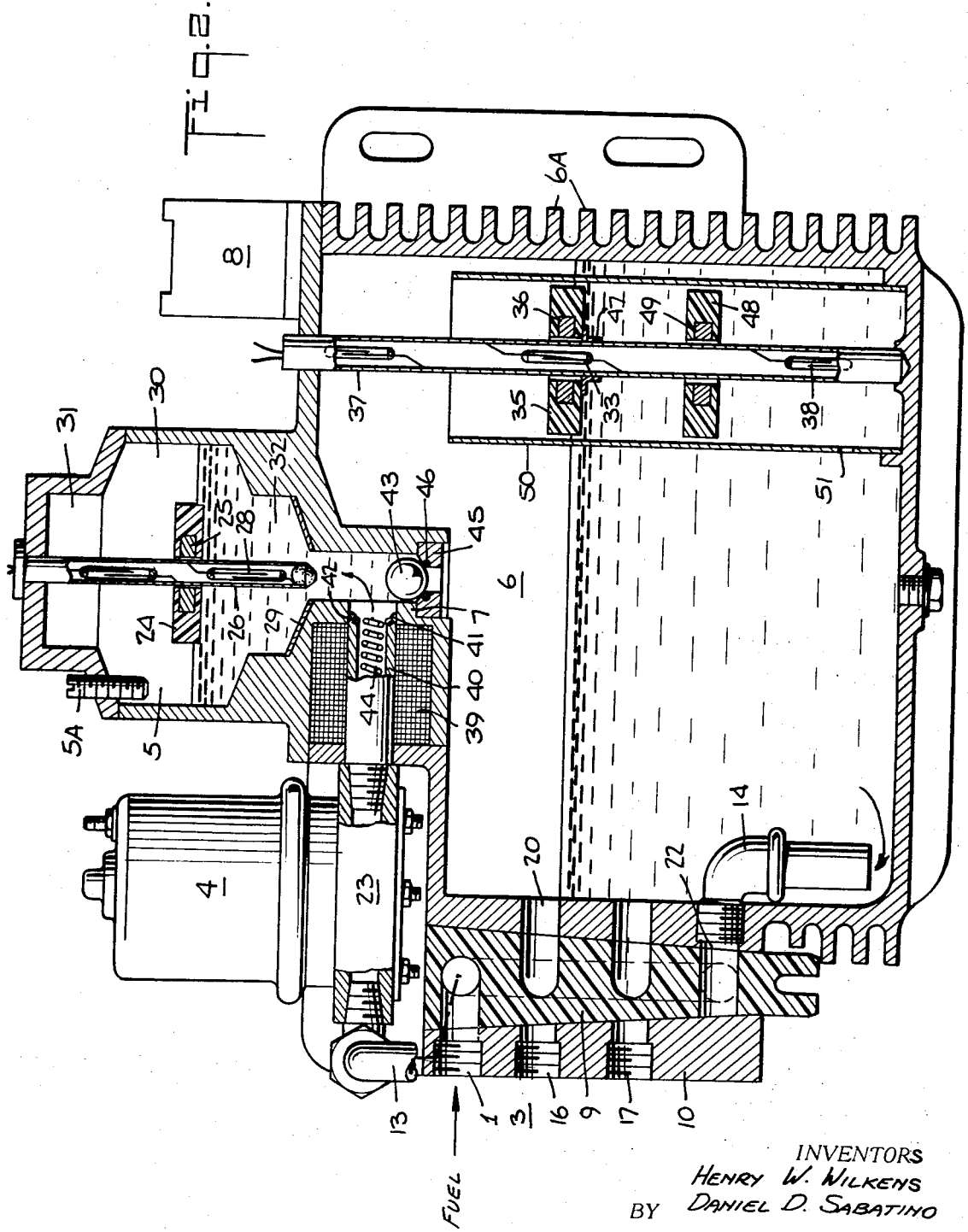
FIGS. 2 and 3 are sections along 2—2 of FIG. 1.
Figure 3:
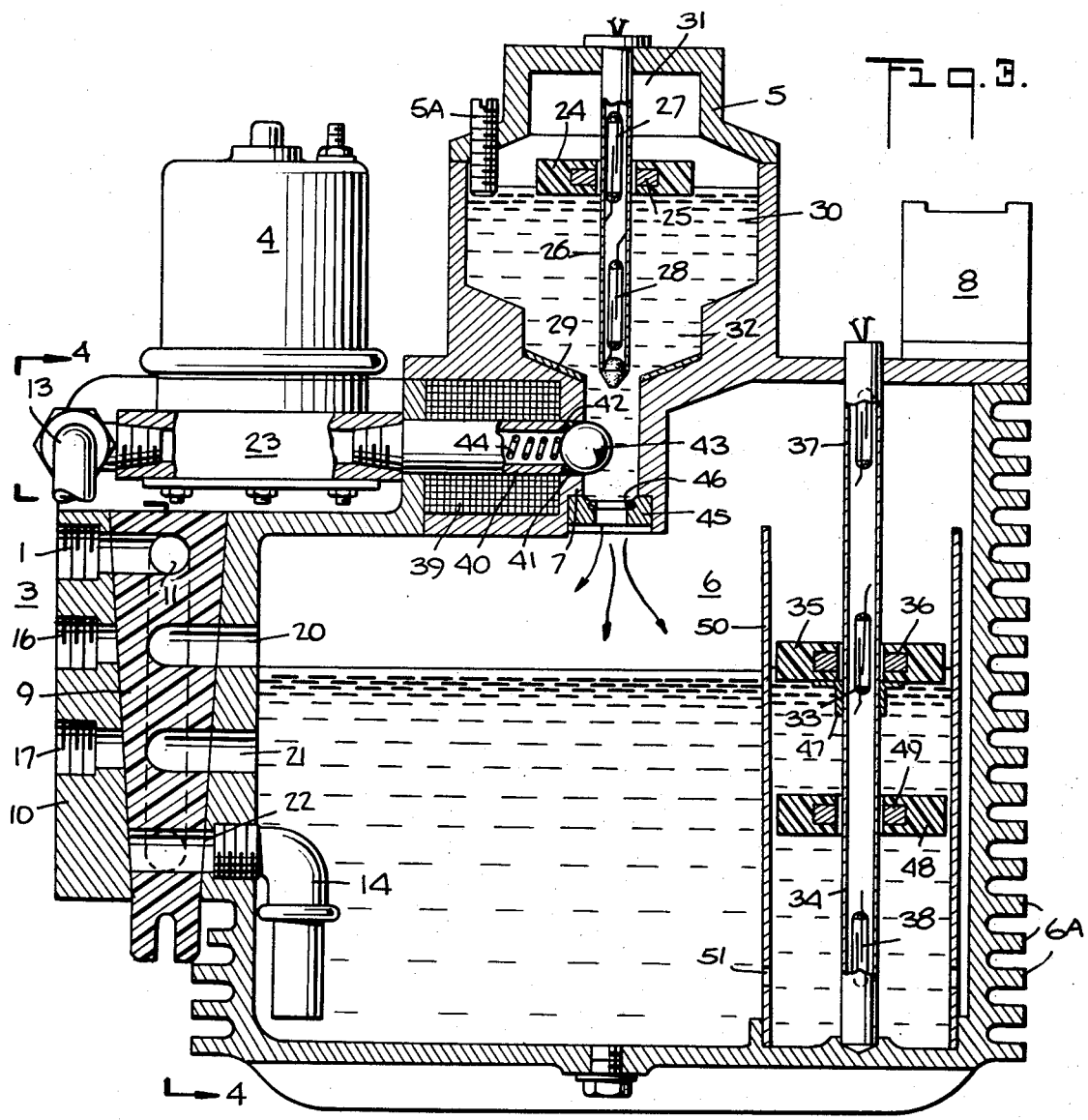

When valve 3 is in its normal position (as shown in FIGS. 4 and 5) in which the meter is not by-passed, pump 4 may supply fuel to fuel measuring chamber 5 whenever the fuel level in the reservoir 6 drops to some low level. At that time, measuring chamber 5 measures a fixed quantity of fuel (FIG. 2) which is then emptied (FIG. 3) into the reservoir 6 by means of valve 7. A counter 8 counts the number of times such a measured fixed quantity is so emptied into reservoir 6 and in that manner total fuel consumption for any given journey or period of time can be determined by multiplying the total count of counter 8 by the measured fixed quantity of measuring chamber 5 (1/10 of a gallon, for example).

Valve 3

Valve 3 has a rotatable conical core 9 rotatable within a correspondingly conically shaped seat within block 10. Suitable conduit channels are provided in core 9 and block 10 so that rotation of core 9 from one to the other of two positions 90° apart will either so align the channels to feed fuel through the meter to outlet 2 or align the channels to by-pass the meter to feed fuel directly to the outlet 2. Thus, core 9 has a right angled L-shaped hole 11 and a right angled T-shaped hole 12 through it, hole 11 being for fuel inlet and hole 12 being for fuel outlet. Rotation of core 9 to the position shown in FIG. 4 will align hole 11 with fuel inlet 1 and pipe connection 13 to pump 4 so that fuel may flow from inlet 1 to pump 4 when the meter is in operation. At the same rotary position of core 9, hole 12 will connect dip tube 14 in the fuel in reservoir 6 to fuel outlet 2 so that fuel may flow from reservoir 6 to the truck engine through passage 22.

Rotation of the core 9 by 90° (FIG. 6) will align hole 11 with fuel inlet 1 and fuel by-pass channel 15; and hole 12 with by-pass channel 15 and fuel outlet 2 so that fuel flows directly to the engine and by-passes the meter.

Core 9 may be rotated by a screwdriver 16A (FIG. 6).

Inlets 16 and 17 in valve 3 are for fuel returned by the engine to reservoir 6. Diesel engines require at least one such return, some require two such returns. The returned fuel is from the fuel injectors and is usually quite warm, hence the fins 6A on reservoir 6 to facilitate cooling of the fuel before it is drawn back to the diesel engine. The other return is from the pressure relief valve of the engine fuel pump. Core 9 also has diametric holes 18 and 19 which in the fuel metering position of core 9 are aligned with inlets 16 and 17, and passages 20 and 21 to permit the so returned fuel to flow through passages 20 and 21 to reservoir 6. In the by-pass, fuel return to reservoir 6 is blocked by the fact that holes 18 and 19 are not so aligned with passages 20 and 21, and inlets 16 and 17.

Fuel Pump

Fuel pump 4 is any conventional pump for supplying fuel through a channel 23 to valve 7.

Fuel Measuring Chamber

Fuel measuring chamber 5 has a float 24 which floats up and down on the surface of any fuel in chamber 5 concentrically around a tube 26. Float 24 has within it a permanent magnet 25 for actuation of reed switches 27 and 28 within tube 26. Reed switch 27 is positioned so that when actuated by magnet 25, it senses a high level position of the fuel in measuring chamber 5, this high level being such that when chamber 5 is filled with fuel to that high level the chamber 5 contains a precisely measured fixed quantity of the fuel for emptying into reservoir 6. Reed switch 28 is positioned so that when actuated by magnet 25, it senses a low level position in measuring chamber 5, this low level being such that when chamber 5 has emptied to that low level, the valve 7 is actuated to discontinue any further emptying of fuel into reservoir 6.

A ferrous (iron) perforated shield 29 is provided at the bottom of measuring chamber 5; its purpose is to shield the magnetically actuated reed switch 28 from the magnetic flux field emanating from the solenoid coil 39 when the solenoid is energized. If this shield were not there, the reed switch 28 might close when the solenoid is energized.

The geometry of chamber 5 is particularly to be noted. It will be noted that there is a large cylindrical cross-section in the middle portion 30 and small cylindrical cross-section in portions 31 and 32 at the top and bottom respectively around the high and low levels at which the reed switches 27 and 28 are supposed to operate. The purpose of this geometrical arrangement is as follows: The up-down movement of float 24 are, of course, to measure fuel levels as accurately as possible. But accuracy of detection of the high and low levels in chamber 5 is greater when the up-down distance of the float movement per unit of fuel, either supplied or emptied, is great.

It will therefore be noted that the ratio of vertical float movement to unit quantity of fuel either fed into or emptied out of chamber 5, is greater in portions 31 and 32 of small cross-section than in portion 30 of large cross-section.

By raising or lowering trimming screw 5A, the volume of measuring chamber 5 can be set to exactly one tenth of a gallon or whatever unit content is desired.

Reservoir 6

The purpose of reservoir 6 is to provide a reservoir of fuel for the truck engine. The truck engine draws fuel from reservoir 6 as occasion demands through dip tube 14. Whenever the engine has depleted the fuel reserve in reservoir 6 to some low level at which reservoir 6 should be replenished with fuel, a float-magnet-reed switch arrangement essentially like those in measuring chamber 5 will sense that low level. Thus, reed switch 33 in hollow tube 34 is positioned at a height corresponding to such low level. Float 35 with permanent magnet 36 will close reed switch 33 at that low level.

A bracket 47 affixed to tube 34 prevents float 35 from going below the level of reed switch 33 and thus failing to call for fuel at the lower level, which situation might occur under certain situations as when the truck is sitting at an extreme angle during the need for fuel and float 35 has dropped below reed switch 33. A cylindrical shield 50 suitably perforated with fine holes 51 damps sloshing of the fuel so that the floats 35 and 48 are not unduly affected.

Reed switches 37 and 38 in tube 34 at extreme top and bottom levels are provided as emergency means to actuate warning "red lights" on the dashboard of the truck whenever the fuel level in reservoir 6 is either so high or so low as to indicate that something has gone wrong with the meter functioning—either that it is supplying too much fuel or too little. Reed switch 37 is closed by float-magnet 35-36 when the fuel level is excessively high. Reed switch 38 will be closed by a separate float-magnet 48-49 below bracket 47 when the fuel level is excessively low.

Valve 7

Valve 7 is of novel construction to be claimed in a division of this application.

Valve 7 is particularly suited to high volume, low pressure liquid flow and comprises a solenoid 9 surrounding a soft iron core tube 40 through which the fuel flows. A valve seat 41 including a rubber O-ring 42 is provided for reception of steel ball 43 as a closure member for stopping fuel flow through tube 40. Spring 44 provides a bias against ball 43, when seated, of sufficient force such that the ball will move away from seat 41 more rapidly when solenoid 39 is deenergized. A second magnetic valve seat 45 is provided and formed of permanent magnetic material and rubber O-ring 46 for reception of ball 43.

The operation of valve 7 is as follows: When solenoid 39 is energized, ball 43 will be drawn by magnetic forces to seat 41 against O-ring 42. When the solenoid 39 is deenergized the ball 43 will be attracted magnetically by magnetic valve seat 45 to block fuel flow into reservoir 6. The magnetic force of the solenoid 39 is sufficient to draw ball 43 back to seat 41 against the magnetic attraction of seat 45 whenever the solenoid 39 is energized

Electrical Control Circuit and Operation of the Meter

Figure 7:
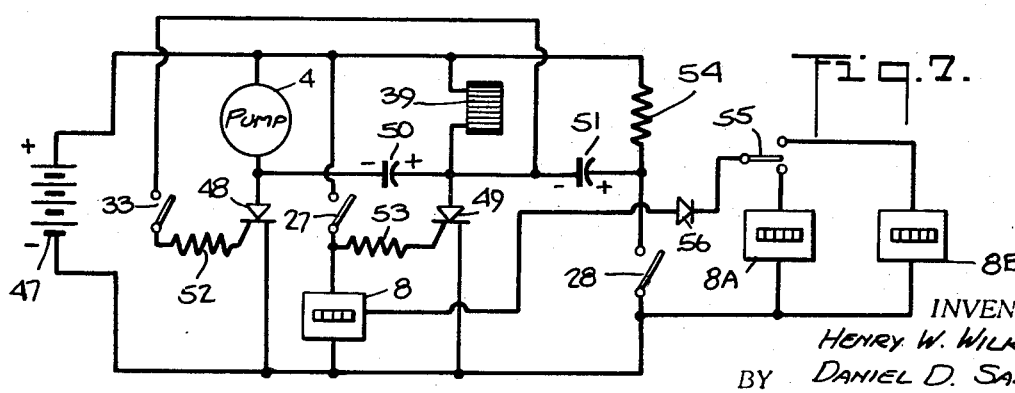
FIG. 7 shows the electrical circuit for operating the meter.

Referring to FIG. 7, the previously referred to pump 4, solenoid 39, counter 8, and reed switches 27, 28 and 33 are shown in a control circuit with a twelve volt source 47, silicon controlled rectifiers (SCR's) 48 and 49, commutating capacitors 60 and 51 and resistors 52, 53 and 54. Since some trucks have a negative ground and some a positive ground, the circuit is not grounded so that it may be used with both types of trucks.

The operation is as follows: Assume that the fuel level in reservoir 6 has dropped to the level of reed switch 33; that the fuel measuring chamber 5 is empty so that reed switch 28 is closed by float-magnet 24-25 while reed switch 27 is open; and that both SCR's 48 and 49 are non-conductive but with the voltage of source 47 on their anodes. When float magnetic 35-36 drops to the level of reed switch 33, it will close reed switch 33. Thereupon positive voltage is supplied to the gate or SCR 48 through resistor 52 from the anode of SCR 49 which, being non-conducting at the time, has the full voltage of source 47 on its anode. SCR 48 thereupon goes into a conductive state to energize the fuel pump 4. Fuel then passes (FIG. 2) into measuring chamber 5 through valve 7, seat 41, ball 43 then being on seat 45-46 since coil 39 is then deenergized. The pump fills chamber 5 to the high level at which level reed switch 27 is closed by float magnet 24, 25 and reed switch 28 now opens. Voltage from source 47 is thus supplied to the gate of SCR 49 through resistor 53 to cause SCR 49 to conduct and energize solenoid 39 while commutating capacitor 50, having been charged with the indicated polarity by source 47 through SCR 48 (when conducting) and coil 39, and then grounded by conduction in SCR 49, applies negative voltage to the anode of SCR 48 causing it to stop conducting and shut off the pump 4.

Solenoid 39 then pulls ball 43 to seat 41 so that the measuring chamber 5 empties into reservoir 6.

When float 24 lowers to the point where lower level reed switch 28 is closed by magnet 25, commutating capacitor 51, having been charged with the indicated polarity by source 47 through SCR 49 (when conducting) and resistor 54, and then grounded by switch 28, applies a negative voltage to the anode of SCR 49 to cause it to stop conducting and deenergize solenoid 39. Thereupon ball 43 drops back to seat 45–46. Thus, the precise measured quantity of fuel has emptied into reservoir 6.

As fuel is used by the engine from reservoir 6 the above process is repeated. Each time the cycle is repeated, the counter 8 is energized to count one measured quantity of fuel emptied into reservoir 6.

It will thus be seen that pump 4 cannot be operated when solenoid 39 is energized. That is to say that when SCR 49 is conducting, SCR 48 cannot conduct even though switch 33 be accidentally closed as by up-down movement of float 35 caused by sloshing movement of the fuel in reservoir 6. This is because the anode of SCR 49 when conducting is at negative and therefore there can be no voltage to the gate of SCR 48 to trigger i into conduction. It is only when SCR 49 is not conducting that there will be sufficient voltage at the anode of SCR 49 to so trigger the gate of SCR 48.

The relatively long narrow geometry of measuring chamber 5 makes it impossible for sloshing in that chamber to affect the operation of reed switches 27 and 28.

It may be assumed that in the discussion so far, counter 8 measures total fuel consumption, i.e., consumption while the truck is traveling and consumption during auxiliary operations, as when the truck is stationary and its engine is being used for power take-off for such auxiliary operations as hoisting, compacting garbage, pumping home fuel oil, and the like.

Two additional counters similar to counter 8 may be provided; one to count only fuel used for actual travel, and one to count fuel used in auxiliary operation when the truck is stationary and braked. This is illustrated in FIG. 7.

In FIG. 7, the additional counters are designated 8A (for counting during actual travel) and 8B (for stationary auxiliary operations). Counters 8A and 8B may alternatively be connected to counter 8 by switch 55 operable by the parking brake of the truck, for example, switch 55 may be a pressure operated switch in the brake line of the truck. When the brakes are off during travel switch 55 will connect counter counter 8A to counter 8 through blocking diode 56 so that counter 8A measures fuel consumed in travel. Similarly, when the brakes are on during stationary auxiliary operation, counter 8B will be connected to counter 8 through blocking diode 56 so that counter 8B will measure fuel consumed during stationary operations. The combined counts of counters 8A and 8B will equal the total count of counter 8.

While the invention has been described in connection with its use for metering the fuel consumption of trucks, it will be understood that it is useful where ever liquid usage or flow must be metered. Moreover, the valve 7 will be useful in many other applications where high volume low pressure liquid flow is to be controlled in a similar manner.

What is claimed is:

1. A fuel meter for accurately measuring the quantity of fuel consumed by a vehicle with the accuracy of said measurement being completely independent of the rate of fuel demand by the vehicle engine, comprising a unitary housing adapted to be mounted on said vehicle at a position remote from the fuel tank of said vehicle, a normally inoperative fuel pump mounted on said housing, said housing including a single normally empty, accurately calibrated, volumetric measuring chamber having an inlet and an outlet, said housing further including a fuel reservoir chamber having a volumetric capacity significantly greater than that of said measuring chamber, said reservoir having an inlet and an outlet, an inlet conduit in said housing for supplying fuel from said vehicle fuel tank to the inlet side of said fuel pump, a first conduit in said housing connecting the outlet side of said fuel pump to the inlet of said measuring chamber for supplying fuel only to said measuring chamber when said pump is activated, a normally closed valved conduit between the outlet of said measuring chamber and the inlet of said reservoir chamber for supplying fuel, in an exactly measured increment, from said measuring chamber to said reservoir chamber when said valved conduit is opened, and an outlet conduit for connecting the outlet of said reservoir chamber to the engine of said vehicle to permit said vehicle engine to draw its fuel requirements only from said reservoir chamber, said valved conduit being so positioned that any fuel in said measuring chamber is completely isolated from fuel in said reservoir chamber by an intervening fuel-free space whereby the fuel increment measuring operation of said measuring chamber is independent of the withdrawing of fuel from said reservoir chamber by the vehicle engine, first sensor means for monitoring changes in the level of fuel in said reservoir chamber as said vehicle engine draws its fuel requirements therefrom, control means responsive to said first sensor means for selectively activating said normally inoperative fuel pump when the fuel level in said reservoir chamber falls to a predetermined level to cause said pump to supply fuel from said inlet conduit to said normally empty measuring chamber, second sensor means for monitoring the quantity of fuel delivered by said pump to said measuring chamber, said control means also being responsive to said second sensor means and being operative to deactivate said pump when a predetermined, precisely measured increment of fuel has been delivered to said measuring chamber and being operative substantially simultaneously to open said normally closed valved conduit thereby to completely empty said precisely measured fuel increment from said measuring chamber into said reservoir chamber, and counter means responsive to operation of said control means for registering the number of times that such precisely measured increments of fuel are emptied from said measuring chamber into said reservoir chamber.

2. The meter of claim 1 wherein said housing includes a finned exterior in surrounding relation to said reservoir chamber to facilitate cooling of the fuel in said reservoir chamber before it is supplied to the engine of said vehicle.

3. The meter of claim 1 including a manually operable valve in said housing, in communication with both said inlet conduit and said outlet conduit for selectively bypassing fuel away from the inlet side of said fuel pump to permit fuel to pass directly from said inlet conduit to said outlet conduit.

4. The meter of claim 3 wherein said housing includes a further inlet, in communication with said manually operable valve, for selectively permitting fuel to be returned from the vehicle engine to said reservoir chamber.

5. The meter of claim 1 wherein said first sensor means comprises a magnetically responsive reed switch located within said reservoir chamber, a magnetic float carried by the surface of the fuel in said reservoir chamber, and means for constraining lateral movement of said float to cause said float to move, with variations in the fuel level in said reservoir chamber, along a path located adjacent said reed switch.

6. The meter of claim 5 including two further reed switches in said reservoir chamber in vertical alignment with said first mentioned reed switch at positions above and below said first mentioned reed switch for selectively supplying signals indicative of excessively high and excessively low quantities of fuel in said reservoir chamber.

7. The meter of claim 1 wherein said second sensor means comprises a pair of vertically aligned, spaced, magnetically responsive reed switches, a magnetic float adapted to be carried on the surface of any fuel in said measuring chamber, means for constraining lateral movement of said float to cause said float to move, with variations in the fuel level in said measurement chamber, along a path located adjacent both of said reed switches, said control means being responsive to movement of said float to a position adjacent the upper one of said reed switches to deactivate said pump and to open said normally closed valved conduit, and being responsive to movement of said float to a position adjacent the lower one of said reed switches to close said normally closed conduit.

8. The meter of claim 7 wherein said first con-duit from said pump outlet to said measuring chamber is also valved, said control means being responsive to movement of said float to a position adjacent the lower one of said reed switches to open said valved first conduit while closing the normally closed conduit between said measuring chamber and said reservoir chamber.

9. The meter of claim 8 wherein said valved conduits are controlled by a common valve.

10. The meter of claim 1 including manually adjustable means for adjusting the interior volume of said measuring chamber.

11. The meter of claim 1 wherein said counter means includes a pair of counters for registering respectively the number of times that such precisely measured increments of fuel are emptied into said reservoir chamber while said vehicle is in motion, and the number of times that such precisely measured increments of fuel are emptied into said reservoir chamber while said vehicle is stationary, and means for rendering a selected one of said pair counters operative.

12. The meter of claim 1 wherein said predetermined precisely measured increment of fuel is 1/10 of a gallon.

* * * * *